United States Patent

Rindal et al.

[11] Patent Number: 6,020,939
[45] Date of Patent: Feb. 1, 2000

[54] METHOD AND APPARATUS FOR REDUCING ELECTROMAGNETIC INTERFERENCE RADIATED BY CATHODE RAY TUBE DISPLAYS

[75] Inventors: Abraham E. Rindal, Fremont; Ronald H. Ih, San Francisco; Michele K. Law, Mountain View, all of Calif.

[73] Assignee: Sun Microsystems, Inc., Palo Alto, Calif.

[21] Appl. No.: 08/588,658

[22] Filed: Jan. 19, 1996

[51] Int. Cl.[7] .................................................. H04N 5/68
[52] U.S. Cl. .......................... 348/805; 348/819; 348/820; 315/85
[58] Field of Search ................................ 348/819, 805, 348/806, 820; 315/3, 10, 85

[56] References Cited

U.S. PATENT DOCUMENTS 5,659,399  8/1997  Rindal et al. ............................ 348/820
5,757,338  5/1998  Bassetti et al. ......................... 348/819

Primary Examiner—John K. Peng
Assistant Examiner—Linus H. Lo
Attorney, Agent, or Firm—Michael A. Kaufman; Flehr Hohbach Test Albritton & Herbert LLP

[57] ABSTRACT

Electromagnetic interference ("EMI") is reduced in a CRT video display system by spreading-out the EMI-producing spectra present in the video pixel data and/or clock signals. A clock dropping circuit coupled between the display generator main oscillator and the timing generator periodically phase-modulates the timing generator clock signal such that it comprises N phases, where $N \geq 2$. As a result, each horizontal line of video data and the horizontal synchronization signals is phase shifted. This dual-shifting effect eliminates display image distortion that would result if only the video signal were shifted. Video distortion is further minimized by deriving the horizontal and vertical synchronizing signals from a common constant clock. EMI energy associated with each clock harmonic is spread by a frequency amount $\Delta f$ proportional to the rate of phase change in the clock signal, the rate of phase change exceeding half the bandwidth $f_m$ of a standard EMI measurement reference window. This disperses adjacent spectral energy sufficiently so the reference window measures but one, decreased, amplitude at a time.

22 Claims, 9 Drawing Sheets

METHOD AND APPARATUS FOR REDUCING ELECTROMAGNETIC INTERFERENCE RADIATED BY CATHODE RAY TUBE DISPLAYS

FIELD OF THE INVENTION

The invention relates to reduction of electromagnetic interference radiated by electronic systems utilizing a rapidly switching clock signal, and more specifically to methods and apparatuses for reducing such radiation in video systems that include a cathode ray tube ("CRT") display.

BACKGROUND OF THE INVENTION

Cathode ray tube displays are used to display video information in a variety of applications including desktop computers, televisions, and the like. While CRT displays can advantageously provide high resolution images at relatively low cost, like nearly all electronic systems, such displays generate electromagnetic interference ("EMI"). Because EMI adds signals to an already congested radio spectrum, the amount of permissible EMI is subject to applicable governmental regulations.

The EMI-radiating performance of a system may be evaluated by measuring equipment emissions within a narrow frequency reference window at individual frequencies. In the United States, applicable Federal Communications Commission regulations dictate using a 120 KHz wide (e.g., $f_m$=120 KHz) standard reference measurement window that is swept from about 30 MHz to 1 GHz for purposes of making EMI measurement. Measurement involves a time integration of the spectral energy of the emissions occurring within the reference measurement window. The measured average emission magnitude at each frequency window is compared to published pre-specified limits, and a determination is made as to whether excessive EMI is being radiated. If excessive radiation is present, measures must be taken to bring the EMI-emitting system into compliance within acceptable emission limits.

It is known in the prior art to absorb or otherwise attenuate emitted EMI. It is also known to generate signals that have less spectral energy falling within the bandwidth of the EMI reference measurement window. These prior art techniques will now be reviewed with respect to reducing EMI in a video CRT display system.

FIG. 1 depicts a CRT display 10 and its display generator system 20, as well as several prior art techniques commonly used to reduce EMI-emissions 30 from the CRT display. CRT 10 frequently typically can display combinations of red, blue, green colors to form color images, or may in fact be a monochrome display tube.

Display generator system 20 comprises a main oscillator 40 whose frequency is normally crystal controlled and whose output signal is input to a digital timing generator 50. Timing generator 50 produces a pixel clock signal ("CLOCK") as well as horizontal and vertical synchronization signals, 60, 70 ("HSYNC", "VSYNC"). Generator 50 typically includes separate counters that count oscillator clock cycles to determine when to output the synchronization signals that clock the data signals. This technique permits consistent self-aligning of the horizontal and vertical synchronization signals 60, 70.

The horizontal synchronization signal 60 determines the length of a scanned horizontal line of video data, and the vertical synchronization signal 70 determines how many such horizontal scanned lines of data shall be displayed. Thus, the HSYNC and VSYNC synchronization signals 60, 70 allow CRT 10 to determine the horizontal and vertical size boundaries of the image that is displayed. Further, these synchronization signals permit CRT display 10 to align incoming analog video pixel data received via a data bus 80 with a particular (x, y) display location on the CRT screen. As such, all system clocking is provided by oscillator 40 and generator 50, and CRT 10 has no internal clocks or other time dependent element, and no inherent time dependencies.

Graphics generator 60 outputs a signal to video frame buffer memory unit 90, frequently referred to as video random access memory or "VRAM". As shown in FIG. 1, the horizontal and vertical synchronization signals are coupled to the video memory 90 as well as to the CRT 10. The stored or buffered graphics (e.g., pixel data) information is clocked out of memory 90, relative to the horizontal and vertical synchronization signals 60, 70, into a digital-to-analog ("D/A") converter 100. Converter 100 outputs an analog video signal that is carried by the data bus 80 to CRT 10 for display.

To preserve good integrity of the video signal, the rise and fall times of the clocked pixel data on bus 10 is typically very short, e.g., <10 ns. As such, signals on bus 80 are rich in high frequency harmonics, and tend to radiate substantial EMI. The video data on bus 90 is displayed sequentially line-by-line on CRT 10, with the displayed position of each pixel being determined by the number of clock pulses from the relevant horizontal and vertical synchronization signal.

It is known in the art to provide the system of FIG. 1 with an EMI-reducing module 110 that can include one or more low pass filters 120, and/or ferrite beads or other energy absorbing components 130. Such low pass filters and energy absorbing components may be useful in reducing differential mode and common mode EMI, respectively. Low pass filter 120 may be implemented with conventional components such as operational amplifiers, resistors, capacitors, inductors. These filters typically have a cutoff frequency of about twice the relevant fundamental frequency. As such, the lowpass filters attenuate some high frequency components from the panel clock and data bus signals, and can reduce EMI to a limited degree.

But low pass filtering can only be truly effective when the EMI signals are in a differential mode, e.g., where EMI is present on the pixel clock and/or data bus signal wires, but is absent from the system ground 140. Reducing the effective impedance of the system ground return 140 will reduce the EMI voltage drop resulting from EMI signal currents. Reducing the ground impedance can be a very effective method of reducing EMI.

In some application the EMI is common mode, e.g., carried on the wire, the data bus wire(s), and also on ground. It is known in the art to reduce common mode EMI by placing energy dissipating elements such as ferrites 130 around such wires. The dissipating elements absorb the electromagnetic energy from the EMI, converting the energy into heat. The use of ferrite beads, cores, or other dissipating elements can effectively contain EMI to limited areas within an enclosure. However, the amount of EMI attenuation is relatively small, and other EMI-reducing techniques must also be used.

It is also known in the art to surround EMI-radiating equipment with a metal shield 150 that confines the radiation to the equipment. Shielding can be effective but can be costly and add to the system size. Further, effective shielding may impair system cooling, for example by reducing or eliminating ventilation openings.

FIG. 2A depicts a CRT screen raster, and demonstrates the manner of scanning an electron beam across lines (e.g., lines 1, 2, 3, ...) onto the phosphors of CRT 10 to display video data from bus 80. For ease of illustration, FIG. 2A depicts only 18 horizontal scan lines. However in actual display systems, the number of scan lines is substantially higher, 768 for example in a conventional computer monitor.

In so-called non-interlaced scanning system, scan line 1 is traced rapidly to the right and slightly downward by the CRT electron beam, whereupon the beam rapidly retraces horizontally right-to-left. (The horizontal retrace is shown in phantom in FIG. 2A.) Scan line 2 is then traced right and slightly downward, then a rapid right-to-left horizontal retrace. This pattern is continued until at the bottom of the CRT display, the last scan is made, whereupon the first "field" of scan lines (768 for a conventional computer monitor) is complete.

In a computer video monitor display system, the horizontal scanning rate ($f_{horiz}$) is commonly a frequency within the range of about 32 KHz for lower resolution displays to about 82 KHz for high resolution workstation displays. If $f_{horiz} \approx 82$ KHz, then each horizontal scan will occupy about $1/82,000$ second, or about 12.2 $\mu$s. The vertical retrace time for computer video monitor displays typically is in the range of about 60 Hz to about 77 Hz.

Upon completion of the first field, the electron beam rapidly retraces vertically, and the next field of scan lines 1, 2, 3, ... is traced out. When this second field of scan lines is completed, the third field is traced, and so forth. In a system where each field is scanned at a rate of 60 Hz, the vertical retrace time will be $1/60$ second or 16.66 ms. (In a so-called interlaced scanning system, alternating fields of even scan lines and odd scan lines would be traced.)

During times of horizontal and vertical retrace, the scanned electron beam is inactive in that video circuitry associated with CRT 10 blanks-out the effect of the electron beam upon the phosphors of the CRT. Typically, horizonal retrace time is about 2 $\mu$s, and vertical retrace time is about 300 $\mu$s. During active scan times, whether portions of each scan line are light or dark (or colored), bright or dim, is determined by the voltage magnitude of the analog video signal present on video data bus 80.

FIGS. 2B and 2C depict the relationship between the video signal on data bus 80, and horizontal synchronization signal 60. In FIG. 2B, time interval $T_1$ represents the active portion of each horizontal scan, about 12.2 $\mu$s for a computer video signal having $f_{horiz} \approx 82$ KHz. Following the active scan, the electron beam remains at the right side of the screen for a period of time $T_2$, known as the "front porch", a time that typically is about 0.5 $\mu$s in a computer video system. Following time $T_2$, the horizontal synchronization signal (shown in FIG. 2C) goes high for a time interval $T_3$ (about 0.5 $\mu$s for a computer video system) and then goes low again.

It is the low-to-high transition of the horizontal synchronization signal following time $T_2$ that initiates the electron beam horizontal flyback to the left side of the CRT screen, to begin the next scan. The flyback occupies time $T_4$ and is typically about 2 $\mu$s for a computer video system. During time $T_4$, the electron beam is still scanning from left to right, but there is no new video signal and no display is seen until the video signal begins at the end of interval $T_4$. But if there is no new video data, the electron beam will scan existing video information across the CRT screen, which makes the video image appear to be stretched-out horizontally. By contrast, if the onset of video were delayed by N pixel clock cycles, e.g., by ($T_4$+N), the displayed image would appear right-shifted by N pixels.

After a number of scans corresponding to a field, the vertical synchronization signal occurs, which returns the electron beam from the screen bottom to the screen top. The vertical synchronization pulse will occur after a number of horizontal scans of video data, e.g., after about 768 scans in a typical non-interlaced computer video system.

FIG. 3 depicts the timing relationship between the main oscillator signal, a frequency divide-by-2 version of the main oscillator signal, the synchronization signal, and the video data signal for the prior art system of FIG. 1. The divide-by-2 version of the main oscillator signal is included for ease of comparison with corresponding signals for the present invention, depicted later herein as FIG. 7. It is understood that the pulse trains in FIG. 3 (and indeed FIG. 7 as well) are illustrative and that a great many more pulses are present in the actual waveforms than may be depicted in these figures.

FIG. 4A depicts the clock signal provided by timing generator 50. The clock signal typically is a periodic square wave pulse train, with a repetition frequency $f_c$ of about 100 MHz), and rise and fall transition times on the order of 1–2 ns. As shown by FIG. 4B, in most applications, the pixel data from video frame buffer 90 is clocked over the data bus 80 to CRT panel display 10 on each rising edge of the clock signal. Clocked video data may consist of a single bit or an entire word of data whose bits are clocked simultaneously. As shown, the rising edge of each panel clock signal is equidistant in time from the previous rising edge.

FIG. 4C is a frequency domain representation of the frequency spectra of the clock signal shown in FIG. 4A. As such, FIG. 4C represents the Fourier transform of the corresponding square-wave clock signal whose repetition frequency is $f_c$. Because the clock signal has relatively fast rise and fall times, the corresponding spectral amplitude will, unfortunately, be rich in harmonics, centered about odd multiples of the base frequency $f_c$.

Shown in phantom in FIG. 4C is the bandwidth of the reference window used for EMI-compliance testing. As shown in FIG. 4C, the amplitude of each harmonic of $f_c$ is reduced because the total electromagnetic energy represents the root-mean-square of ever smaller components.

As noted, rapid clock transition times mean that the time domain waveforms of FIG. 4A will be rich in EMI, as shown by the spectra at $1f_c$, $3f_c$, $5f_c$, etc. As a result, as the EMI standard reference window sweeps back and forth horizontally along the frequency axis of FIG. 4C, there will be spectral energy at relatively high harmonics of $1f_c$, for example, at $3f_c$, $5f_c$, etc. In FIG. 4C, in the immediate vicinity of $1f_c$, the reference window will capture a component of EMI having amplitude A1. In the vicinity of the third harmonic $3f_c$, an EMI component of amplitude A3 will be present, and so forth.

The amount of electromagnetic interference is a function of the amount of signal (e.g., EMI spectra) encompassed within the narrow reference window bandwidth $f_m$. Interference is reduced if at least part of the interfering signal components (e.g., some EMI spectra components) are caused to fall outside the narrow bandwidth $f_m$.

For example, it is apparent from FIG. 4C that if all frequency components higher than $1f_c$ were removed, e.g., by an ideal low pass filter 120, relatively little EMI energy would remain within the reference window bandwidth as it sweeps higher than $1f_c$. Unfortunately, however, such excessive low pass filtering would slow the pixel clock and pixel data signals, compromising the ability of CRT 10 to provide a meaningful display.

Theoretically, a more sophisticated approach to reducing EMI would be to replace the crystal controlled main oscillator 40 generator with a frequency slewable clock unit. A clock whose frequency slewed sufficiently rapidly would reduce the amount of time that frequency components fell within the narrow EMI-compliance reference bandwidth. Since EMI measurements represent an integration of spectral energy over time, reducing the time that spectral components fall within the reference bandwidth will reduce their EMI contribution.

Unfortunately, the use of a slewable clock signal is not suitable for CRT video pixel clock generation because changes in the clock frequency would be visible on the CRT screen as size and position distortion.

There is a need for a technique for reducing differential mode and common mode EMI in a display system that effectively reduces EMI without significant impact upon display performance. Preferably such technique should be implementable using off-the-shelf components that do not add significantly to the cost of manufacturing a video display system. Further, such technique should not add significantly to the package size of the video display system, and should not hamper system cooling.

The present invention discloses such a technique.

SUMMARY OF THE PRESENT INVENTION

Electromagnetic interference ("EMI") is reduced in a CRT video display system by spreading-out the EMI-producing spectra present in the video pixel data signal. If spaced-apart sufficiently, the amplitude and number of spectra components within the EMI-measuring window is reduced, which means EMI is reduced.

EMI reduction results from phase-shifting horizontal lines of video data to produce at least M phases (M being an integer $\geq 2$), whose phase-durations need not be equal. The rate of phase-change ("$f_{r-o-c}$") is a frequency corresponding to the frequency spacing ("$\Delta f$") between adjacent spectra in the Fourier transform of the video pixel data signal. Maximum EMI reduction occurs when $f_{r-o-c} \geq f_m$, where $f_m$ is the typically 120 KHz bandwidth of the EMI reference window. However, useful EMI reduction can result even if $f_{r-o-c} < f_m$ if enough spectral components fall outside the $f_m$ measurement window such that the amplitude and number of components within the window meet applicable EMI specifications. As such, it suffices if $f_{r-o-c}$ is comparable to $f_m$, which is to say, sufficiently close to $f_m$ as to cause sufficient sideband spectral spreading to reduce EMI within an $f_m$ measurement window.

Although phase-shifting the video pixel data signal reduces EMI, successive horizontal lines of displayed video become time-shifted, and thus skewed. The present invention therefore also similarly phase-shifts the horizontal synchronization signal along with the video display. By introducing the same at least two phases into the horizontal synchronization signal and the video data signal, skew-type video image distortion is eliminated. Further, video distortion is also minimized by deriving the horizontal and vertical synchronizing signals from a common constant signal that generates the display panel clock signal.

Using the above-described dual-shifting, EMI energy is distributed among the harmonics and adjacent sidebands comprising the panel clock signal. Because the total energy associated with each harmonic is the root-mean-square sum of the harmonic and sidebands, each individual harmonic will have less amplitude than the corresponding harmonic for a conventional square-wave panel clock signal. Thus, EMI is reduced relative to the EMI amplitude associated with a conventional square-wave clock signal for a CRT.

In the preferred embodiment, a square-wave crystal-controlled clock signal of frequency $Nf_c$ is input to a clock dropping circuit that drops one pulse out of every M incoming clock pulses. The resultant intermediate signal is then input to a divide-by-N frequency divider that outputs a clock signal of frequency $f_c$ having first and second phases.

A first panel clock phase comprises unshifted pulses of frequency $f_c$. A second panel clock phase of frequency $f_c$ comprises pulses that are identical to the first phase pulses except they are shifted by $\phi$ relative to the first phase. In the preferred embodiment, a flipflop divider implements the divide-by-N, with the result that $\phi=180°$. However, any non-zero phase shift $\phi$ will also suffice providing the phases are shifted at a sufficiently rapid rate $f_{r-o-c}$ to shift sufficient spectral components outside the $f_m$ EMI measurement window.

In a system having a horizontal scan frequency ("$f_{horiz}$") of about 82 KHz, with equal-duration first and second phases, $f_{r-o-c}=0.5\times 82$ KHz, or 41 KHz. Although adjacent spectra will be separated by $\Delta f=41$ KHz, which is less than $f_m$, sufficient spectral energy is shifted beyond $f_m$ to substantially lower measurable EMI. Thus, in this example, $f_{r-o-c}\approx 41$ KHz represents a frequency comparable to $f_m$ for meaningful EMI reduction. Thus, when measured with a standard reference window of bandwidth $f_m$, EMI is reduced relative to the measurable EMI generated by a square-wave panel clock signal of like voltage amplitude. An electronic component other than a CRT display coupled to phase-shifted clock signal may also experience EMI reduction.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
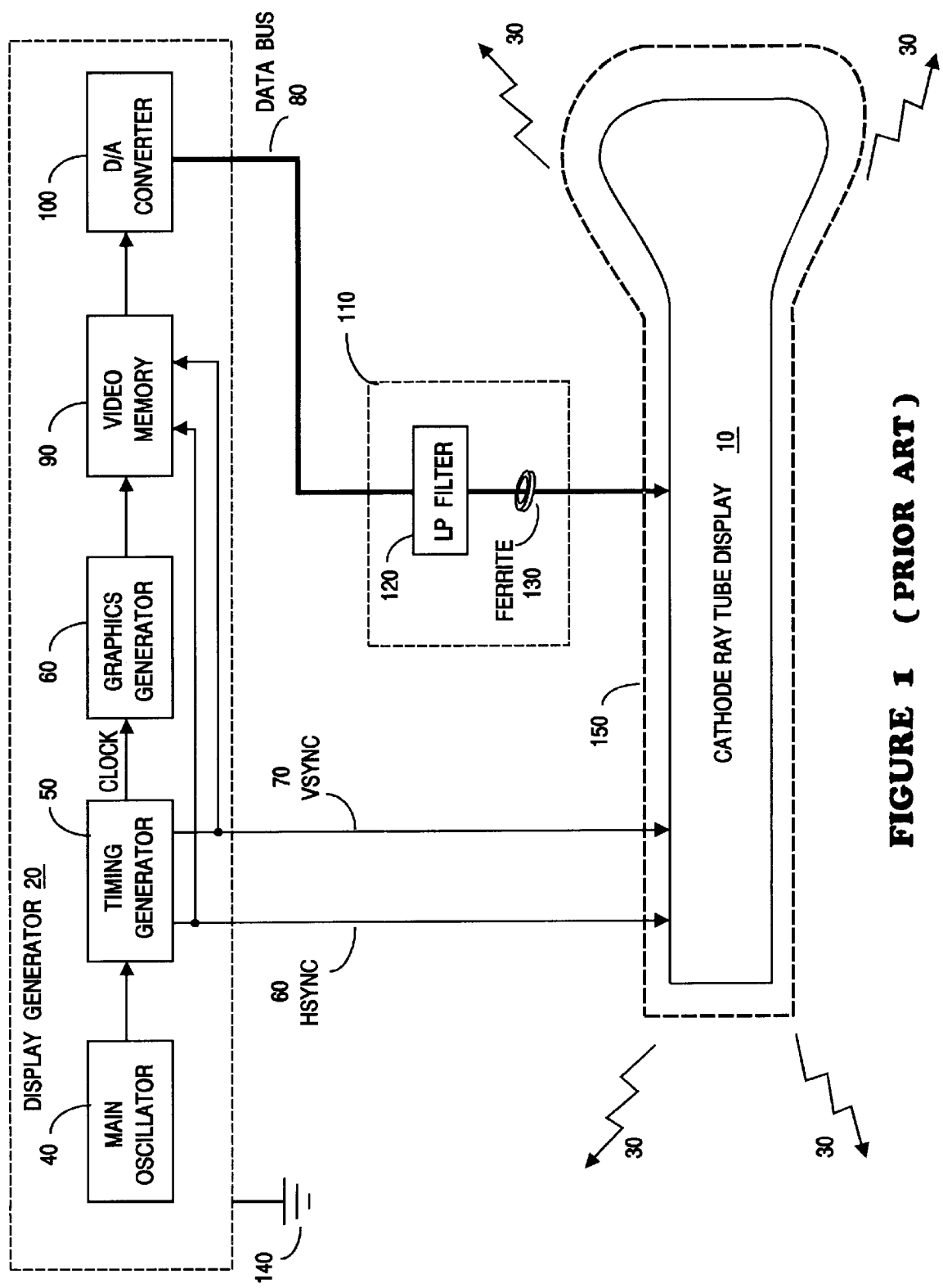
FIG. 1 is a block diagram of CRT video display system that includes EMI reducing techniques, according to the prior art.
Figure 2A:
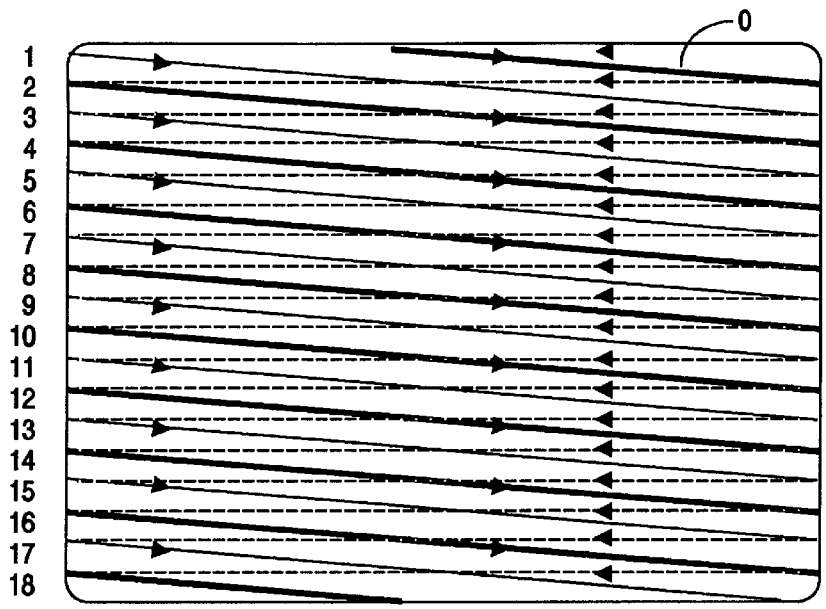
FIG. 2A depicts a CRT raster, according to the prior art.
Figure 2B:
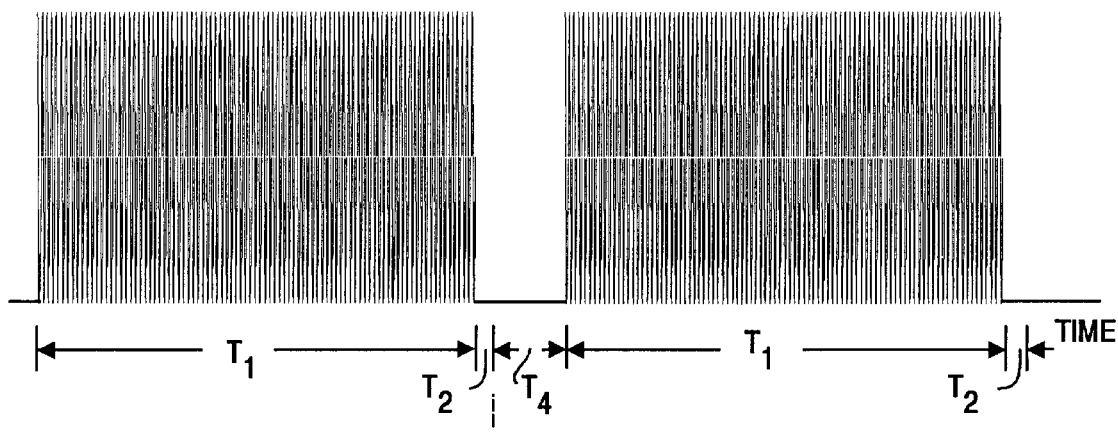
FIG. 2B depicts the video data signal of FIG. 1, according to the prior art.
Figure 2C:
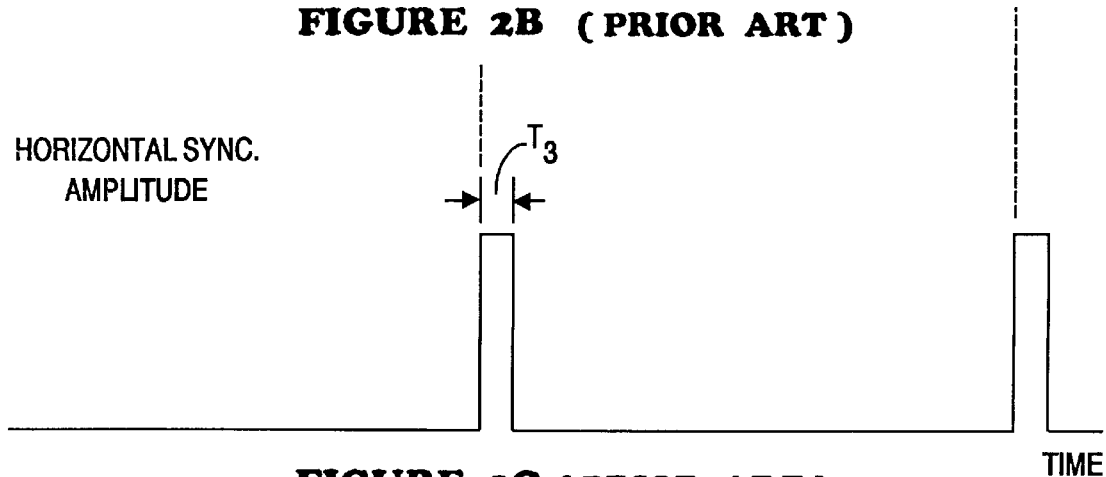
FIG. 2C depicts the horizontal synchronization signal of FIG. 1 relative to the video data signal of FIG. 2B, according to the prior art.
Figure 5:
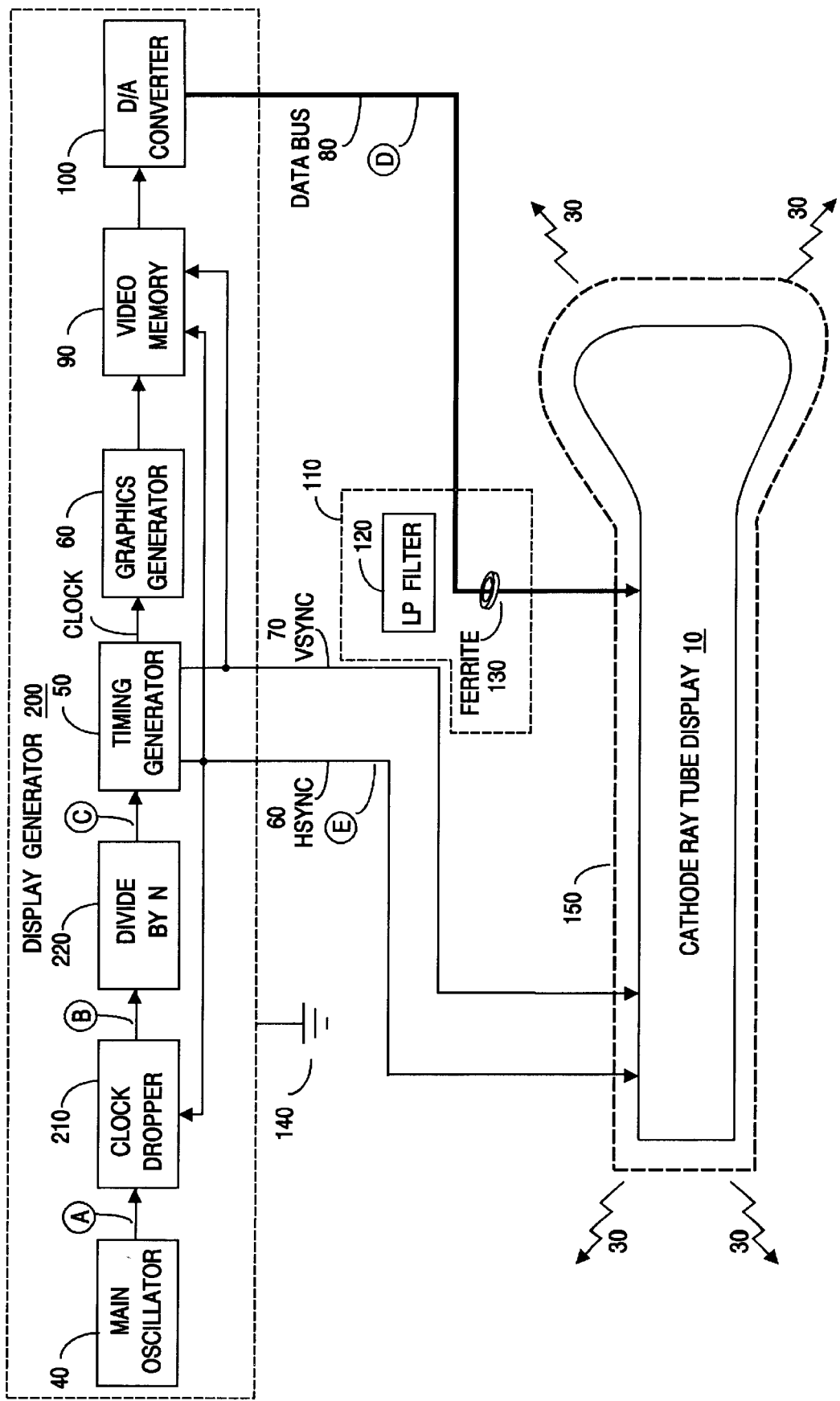
FIG. 5 is a block diagram of a CRT video display system with reduced EMI, according to the present invention.

FIG. 5 depicts a CRT video display system with reduced EMI, according to the present invention, as indicated symbolically by the reduced amplitude size of EMI 30. As will now be described, EMI energy that would otherwise fall within a measurement window is spread or skewed by altering the phase of successive horizontal synchronization pulses, and thus of successive lines of video data. Unless otherwise noted, elements within FIG. 5 bearing like reference numerals to elements in FIG. 1 may represent similar components.

In the system of FIG. 5, display generator 200 includes a clock dropper circuit 210 that drops one out of every M (M>1) incoming main oscillator pulses, causing the pixel clock signal to have exactly M phases. Preferably, one incoming main oscillator pulse is dropped for every horizontal synchronization pulse provided by timing generator 50. Effectively, this drops one clock cycle per horizontal line of video in the video data signal 80.

As a consequence of this time delay, the spectral components of the video data signal are spread-out, with each individual harmonic having lower amplitude (and thus diminished EMI energy) relative to the fundamental signal. Understandably, it is important to thus phase-modulate the pixel clock without producing distortion of the video signal displayed on CRT 10.

The clock dropper circuit is series-coupled between the output of the main oscillator 40 and the input of a divide-by-N circuit 220. As shown, the divide-by-N output signal is input to timing generator 50, whose output is the pixel data clock signal for CRT 10.

While FIG. 5 depicts a conventional EMI reducing module 110 including, for example, at least one pass filters 120 and/or ferrite component 130, as well as shielding 150, it is understood that any or all of these components may be omitted because of the reduced EMI emitted by CRT display 10. Alternatively, if any or all of these conventional EMI reducing components are used, their performance specifications may advantageously be reduced because of the diminished magnitude of EMI remaining to be suppressed.

Figure 6:
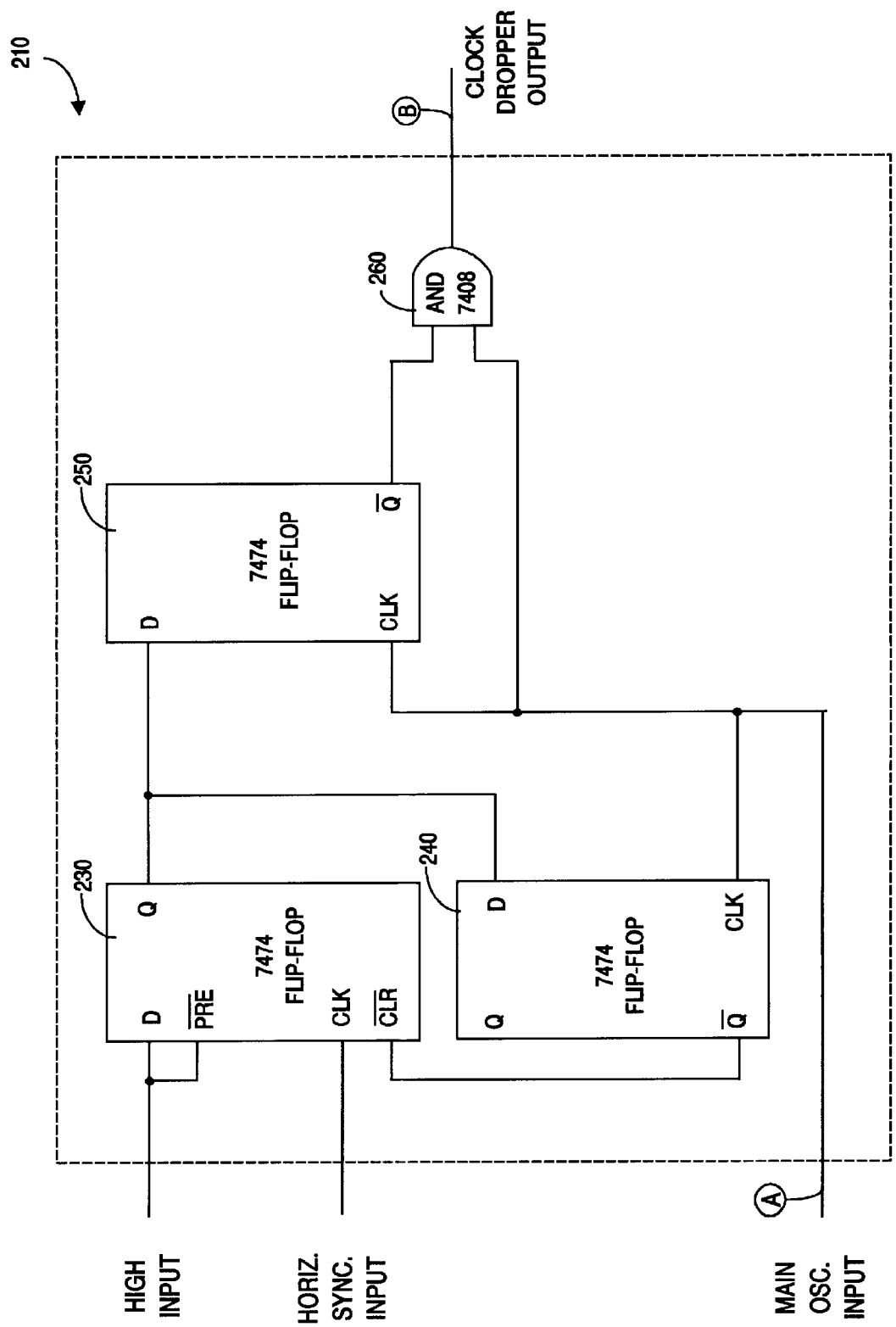
FIG. 6 is a schematic diagram of a clock dropper circuit used in a preferred embodiment of the present invention.

FIG. 6 is a schematic of one embodiment of clock dropper 210, although other configurations are also possible. Units 230, 240, 250 are preferably three type 7474 D-flipflops, and unit 260 is a 7408 type AND gate. Flipflops 240 and 250 should be within a dual D-type flipflop package to minimize any discrepancies between the input hold and input setup times for these flipflops. Flipflop 230 is a positive edge-triggered unit, with preset and clear functions.

As will be now be described, this implementation for clock dropper 210 drops one clock pulse for every horizontal synchronization pulse output by timing generator 50. The "Q" output of flipflop 230 is controlled by its CLK or $\overline{\text{CLR}}$ input signals. At the rising edge of the horizontal synchronization pulse, the "high" or "1" level at the "D" input of flipflop 230 is transferred to the "Q" output of this flipflop. This in turn forces the "D" inputs of flipflops 240 and 250 to go high or to a "1" level. The "high input" signal to flipflop 230 is about +2.5 VDC, and defines a threshold voltage level above which a signal is deemed to be "high" or "1".

During the next clock pulse (e.g., CLK+1), the following events occur:

(a) The high signal to the D-input of flipflop 250 drives the output of flipflop 250 low (e.g., "0"), which forces the CLK output of AND gate 260 low, regardless of the state of the input CLK signal. This effectively drops the high clock pulse for this count;

(b) The high signal to the D-input of flipflop 240 drives the output of flipflop 240 low, which in turn forces low the $\overline{\text{CLR}}$ input of flipflop 230. When $\overline{\text{CLR}}$=0, drives low the Q-output of flipflop 230, regardless of the states of the other inputs to this flipflop;

On the succeeding clock pulse (e.g., CLK+2), the following events occur:

(c) The low D-input to flipflop 250 drives this flipflop output high, which forces the CLK OUT signal from AND gate 260 high. This effectively restores the high clock pulse for this count;

(d) The low D-input to flipflop 240 drives this flipflop output high, which in turn makes the $\overline{\text{CLR}}$ input to flipflop 230 high. This $\overline{\text{CLR}}$=1 condition returns the clear input node of the flipflop to an inactive level, which permits the output of flipflop 230 to remain high until the next horizontal synchronization pulse arrives.

Figure 7:
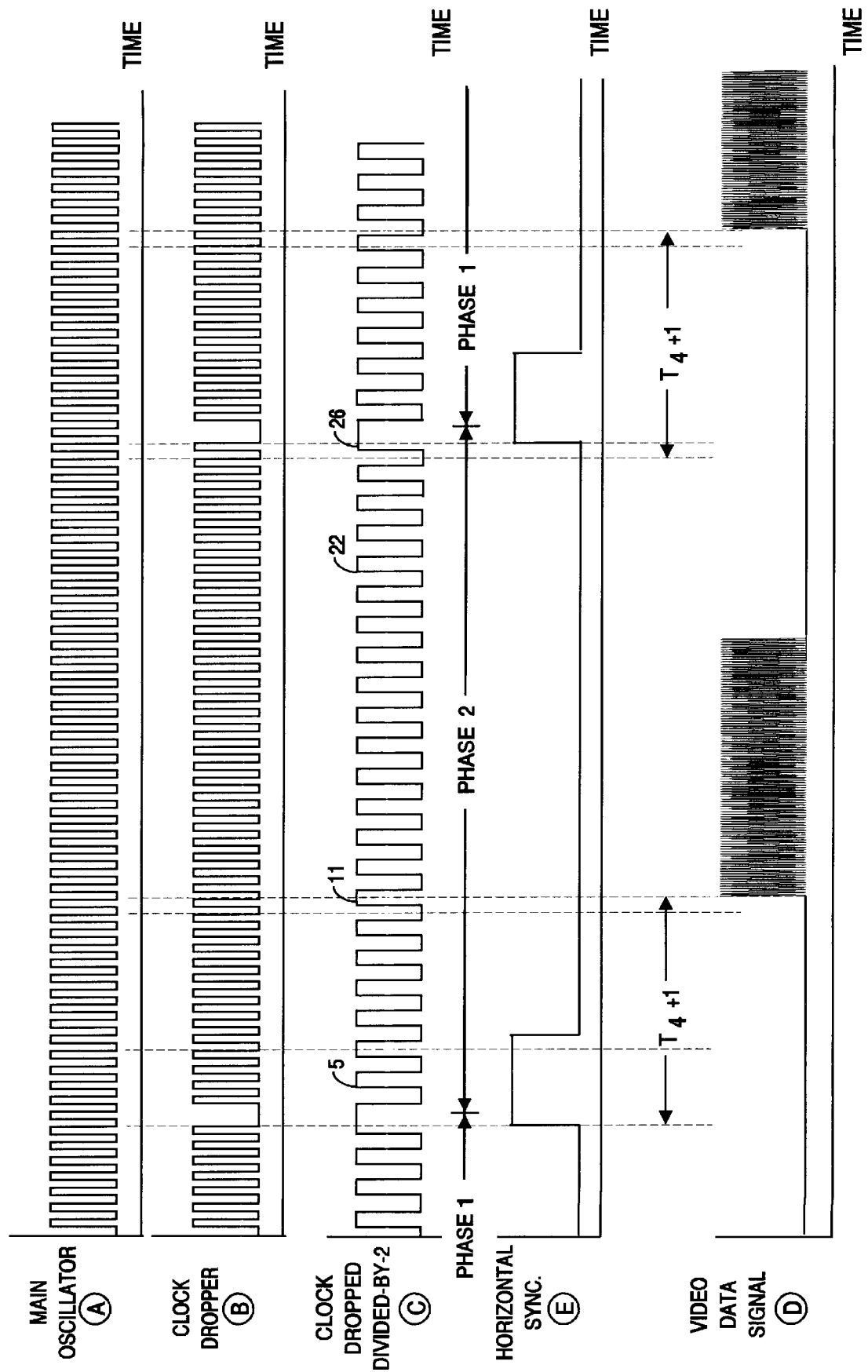
FIG. 7 depicts temporal relationships between the main oscillator, clock dropper, divide-by-two, horizontal synchronization, and video data signals, according to the present invention.

FIG. 7 depicts the effect of the clock dropper circuit 210 upon various signals present in FIG. 5. In FIG. 7, waveform A is the output of the preferably crystal-controlled main oscillator 40. Waveform A has frequency $Nf_c$, where N=2 in the preferred embodiment, and $f_c \approx 50$ MHz, and is typically a square-wave signal having rise and fall transition times of less than about 10 ns.

Waveform A is input to the clock dropper circuit, as shown in FIG. 6. In the manner described above, the clock dropper circuit will "drop" one pulse out of every M incoming pulses.

Waveform C in FIG. 7 is the output of a divide-by-N (N=2) unit, here a flipflop. The divided-down clock dropped output (e.g., waveform C in FIG. 7) has two phases of equal time duration (e.g., equal duty cycle) and of equal frequency. However the phases are separated by $\phi=180°$ in this configuration and introduce a time delay of ½ pixel clock cycle per phase.

Figure 3:
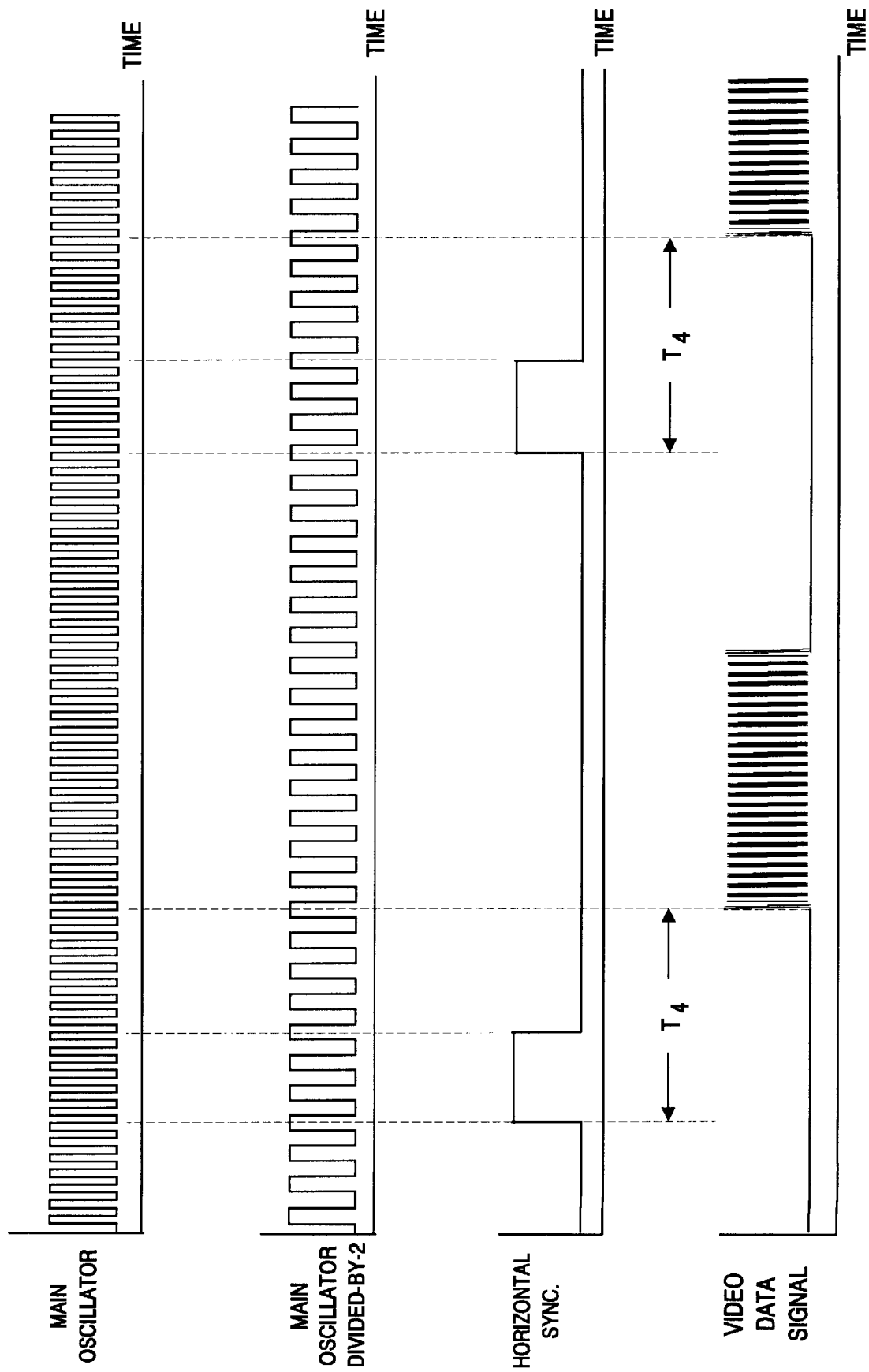
FIG. 3 depicts temporal relationship between the main oscillator, horizontal synchronization, and video data signals, according to the prior art.

It is helpful at this juncture to compare the video data signal (waveform D) and horizontal synchronization pulse signal (waveform E) of FIG. 7 and FIG. 3. In FIG. 7, during a phase 1 sequence, no clock pulses are dropped, and the horizontal synchronization pulse at the end of phase 1 coincides in time with the same synchronization pulse in a prior art configuration. However, as shown by waveform D in FIG. 7, the first line of the video has been right-shifted by one-half pixel clock cycle. Phase two follows immediately after the end of phase 1, and vice versa.

As further shown in FIG. 7, near the end of the phase 2 period, the onset of the horizontal synchronization pulse (waveform E) is right-shifted one clock pulse. Phase 1 then begins, no clock pulses are dropped, but there is still an accumulated one clock pulse delay in the onset of the first line of video, as shown by the righthand portion of waveform D in FIG. 7.

It is noted that the delay between the rising clock signal (waveform C) that triggers the horizontal synchronization pulse (waveform D) and the time required for the horizontal synchronization signal to reach the clock dropper 210 might exceed one clock period. If this occurs, the next clock pulse is not dropped, but the subsequent pulse will be, and the present invention will continue to reduce EMI by spreading the spectra of EMI-containing energy associated with the signals from display generator 200 to the CRT 10.

Referring to FIG. 6, since the horizontal synchronization signal is used to trigger the clock dropper 210 to drop the next incoming clock pulse, the one-half pixel delay occurs once per every scanned line of video data. The effect of this delay is shown in FIG. 7 as the time interval ($T_4+1$). As shown in FIG. 7, this delay occurs before the video signal has begun, and thus the horizontal line of video does not appear distorted when displayed on the CRT, but will appear right-shifted by one-half pixel.

Each horizontal synchronization pulse generated by timing generator 50 is dependent upon the clock count from the previous horizontal synchronization pulse generated. This ensures that each of the phases is equal in length. Because each phase is of equal length, and because the horizontal synchronization pulse is always used to trigger the onset of a new phase, there will be a constant time differential ("$T_4+1$") between the horizontal synchronization pulse and the onset of the video, as shown by waveforms D and E in FIG. 7. Although the entire displayed image is right-shifted by one-pixel, this shift is barely visible, and if need be, may be corrected using the horizontal position control associated with CRT 10.

Although the preferred embodiment creates a clock frequency having two phases, more than two phases may be created in other embodiments. However, there may be no advantage in doing so since it is the rate of change (Hz) between the phases rather than the number of phases that produces spectra spreading according to the present invention.

As shown by FIG. 7, phase shift φ is 180° in the preferred embodiment because the clock dropper essentially removes a pulse, or a time period, in the clock dropper output waveform that represents 180° in the $f_c/N$ clock waveform. If divider unit 220 divided by ten instead of two, the period of time dropped by the clock dropper would, in the $f_c/10$ clock waveform, represent φ=36°, and so on.

Figure 8A:
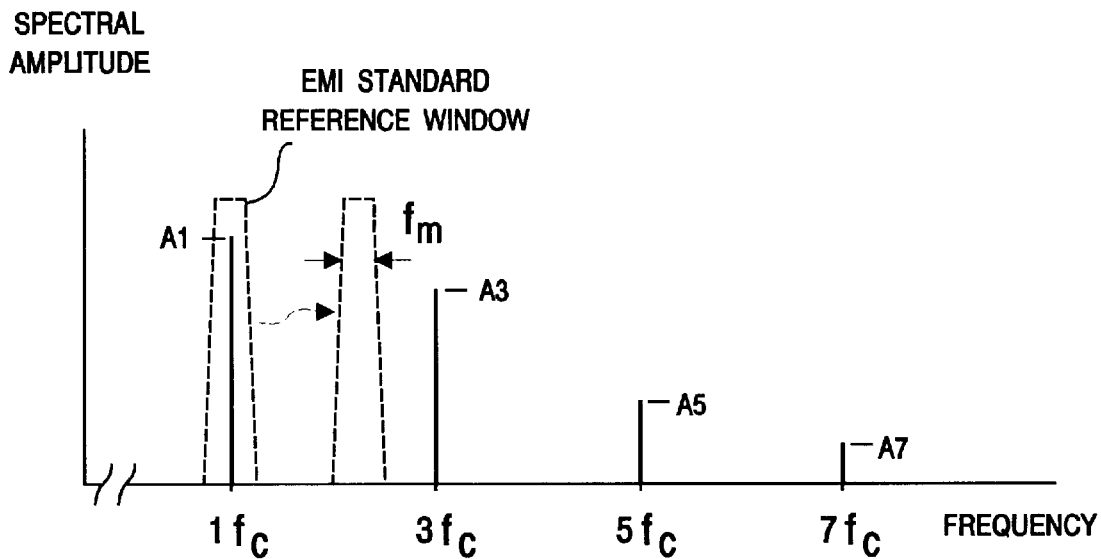
FIGS. 8A and 8B compare EMI frequency spectra for the prior art system of FIG. 1 and for the present invention of FIG. 5.

Although the divide-by-N was implemented with a flipflop (N=2) that produced φ=180°, in practice any amount of phase shift φ>0° will suffice. With reference to FIG. 8A, a non-zero phase shift other than 180° will affect the relative amplitude of the sidebands. If it were readily feasible to implement the desired phase shift φ without dividing by N, a frequency-dividing flipflop could be replaced by such a phase modulating component. In such case, the input squarewave from main oscillator 40 could have frequency $f_c$ rather than $Nf_c$. However, as noted from the preferred relationship $\Delta f \geq 0.5Nf_c/(2M)$, it is the rate of change between the phases, and not the magnitude of the phase, that is important to the present invention, providing that φ>0.

As a further consequence of implementing the divide-by-N with a flipflop, each phase in FIG. 7 has a 50% duty cycle. However, the two phases are not required to have the same duty cycle and in general phase 1 may have a duty cycle of J %, phase 2 a duty cycle of K %, where J+K=100. Again, what is important to the present invention is the rate of change between the two phases and not their duty cycles.

In examining FIG. 7, waveform E, it will be appreciated the time period from the onset of a phase to the onset of the next occurrence of that same phase is twice the period of the horizontal frequency $f_{horiz}$. If, for example, $f_{horiz}$ is 82 KHz, the time period between onset of phase 1 and the next onset of phase 1 (or onset of phase 2 to next onset of phase 2) is approximately 24.4 µs. Stated differently, the rate of phase change $f_{r-o-c}$ is 1/24.4 µs or 41 KHz, e.g., 0.5 $f_{horiz}$. As will be seen with respect to FIG. 8B, spectral sidebands are spaced-apart by multiples of $f_{r-o-c}$, e.g., by a frequency separation representing 41 KHz in the example described.

Clearly when $f_{r-o-c}$ is at least greater than or equal to $0.5f_m$, EMI reduction is optimized due to the resultant spacing of spectral components beyond the measurable $f_m$ window. In practice, EMI reduction according to the present invention is facilitated if the CRT monitor and video system are operated at relatively large $f_{horiz}$ rates, e.g., 80 KHz as opposed to 32 KHz, since the reference window $f_m$ is a fixed value.

Rather than change phase on every other horizontal line of video, phase could be changed on every third or fourth, or other integer number of lines of video. However, this would increase the time period between onset of commencement of adjacent same phase periods, which is to say, $f_{r-o-c}$ would be decreased, an undesirable result. More than one phase change could be implemented within a single line to increase $f_{r-o-c}$, but unfortunately correcting the resultant video distortion would be a complex and challenging task.

Figure 4A:
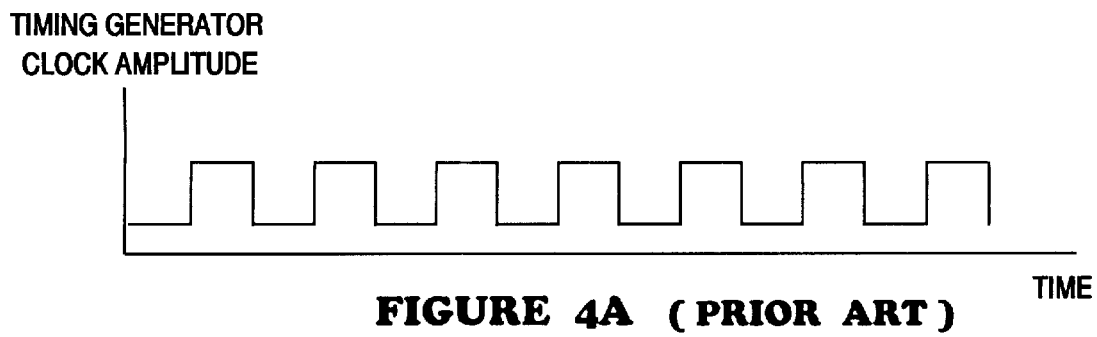
FIG. 4A depicts the timing generator clock signal of FIG. 1, according to the prior art.
Figure 4B:
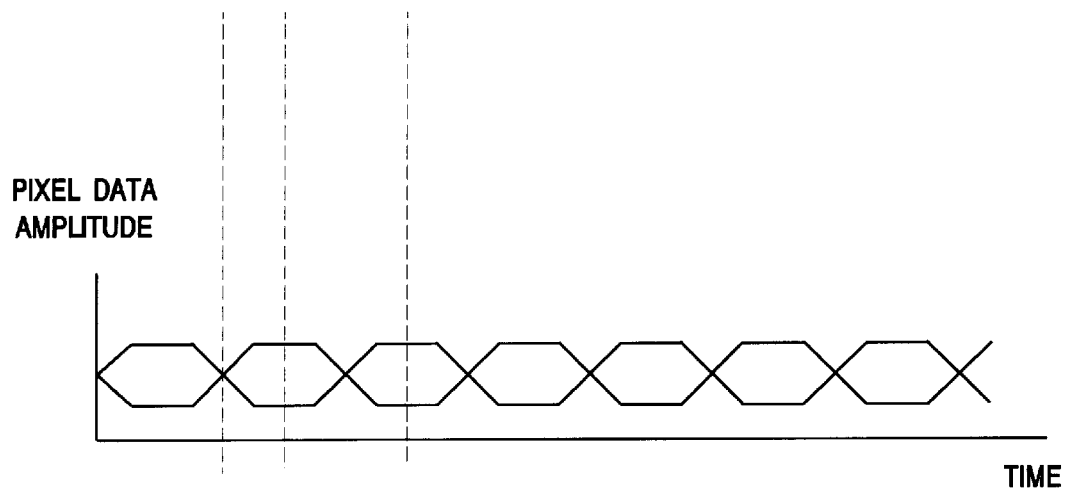
FIG. 4B depicts the video data signal relative to the clock signal of FIG. 4A, according to the prior art.
Figure 4C:
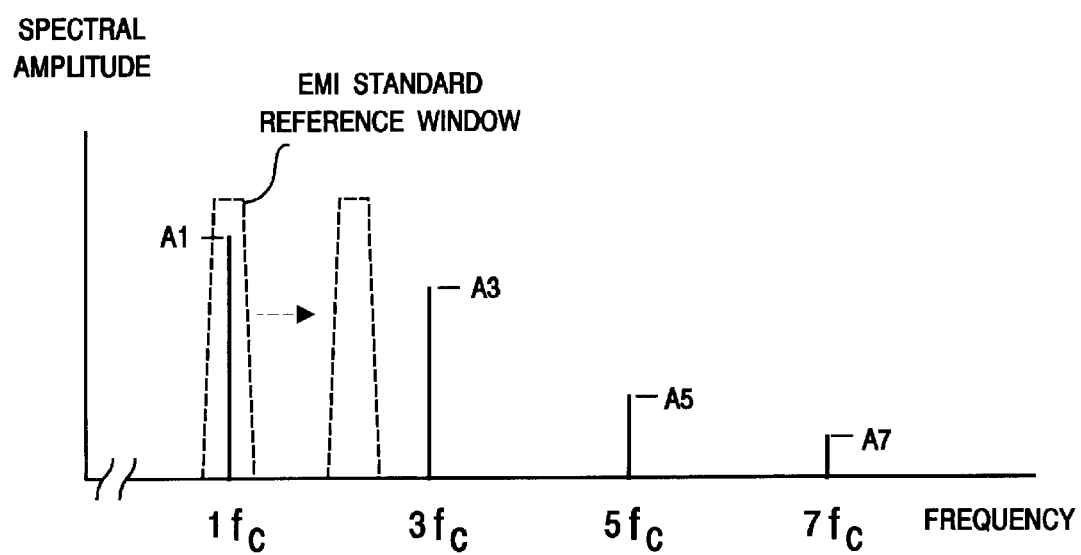
FIG. 4C is a frequency spectrum representation of the spectral contents of the clock and video data signals, according to the prior art.
Figure 8B:
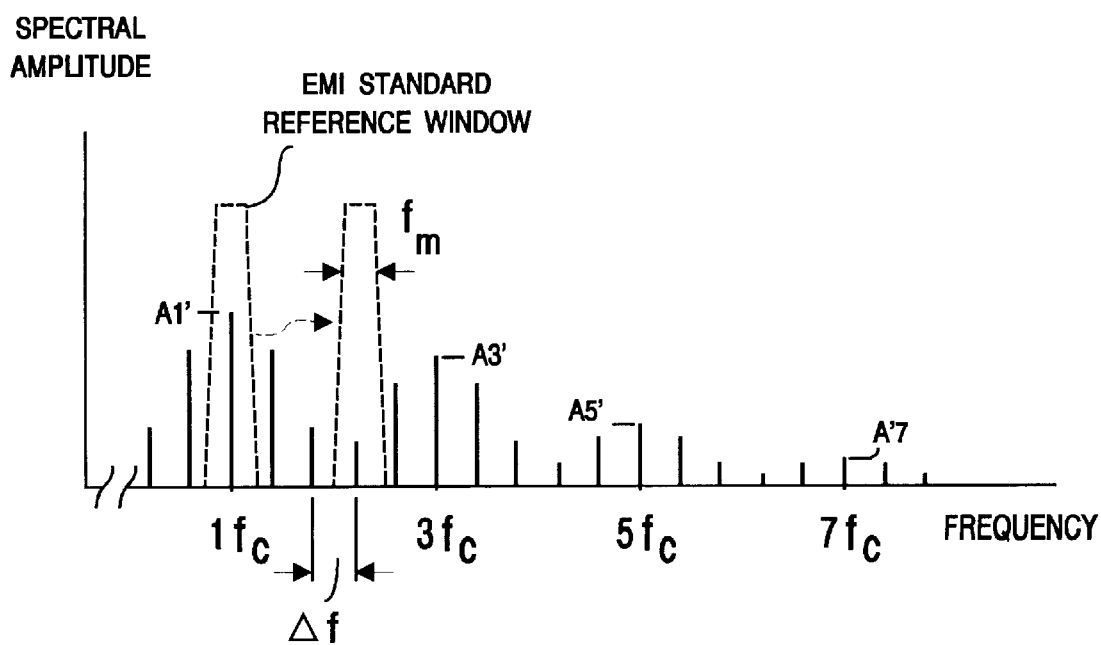

The spectra-spreading achieved by the present invention is readily apparent from FIGS. 8A and 8B. For ease of comparison, FIG. 8A duplicates the prior art spectra shown in FIG. 4C, namely the relatively EMI-rich spectra associated with a prior art square-wave clock signal. By contrast, FIG. 8B demonstrates that in the Fourier transform of a clock-dropped clock signal according to the present invention, EMI energy-containing spectra are advantageously spread in the frequency domain. It is noted that the Fourier transforms depicted in FIGS. 8A and 8B apply to the clock to the DATA signals.

In FIG. 8B, adjacent sidebands are spaced-apart by a frequency distance $\Delta f$ at multiples of $0.5 \times f_{horiz}$. As noted, a larger $\Delta f$, which is to say a larger $f_{r-o-c}$, results in more spectral energy being spread beyond the measurable EMI bandwidth limit $f_m$. In a preferred embodiment in which $f_{horiz} \approx 82$ KHz and two phases were used, $\Delta f = f_{r-o-c} \approx 41$ KHz and resultant EMI was reduced to meet a standard EMI specification. Thus, while the present invention can always reduce EMI, sufficient reduction to meet existing EMI specifications can be attained even if $\Delta f$ or $f_{r-o-c}$ is less than $f_m$. Stated differently, sufficient EMI reduction is attained when $\Delta f$ or $f_{r-o-c}$ is comparable to $f_m$.

As the reference window sweeps horizontally in frequency (as indicated by the curved arrow in FIG. 8B), the measurement window captures relatively few spectral components at a time. Further, as shown in FIG. 8B, the amplitude of each harmonic will be less than the amplitude associated with the corresponding same harmonic in the prior art spectral distribution of FIG. 8A.

Assume that the clock signals whose Fourier transforms are shown in FIGS. 8A and 8B had equal voltage amplitude, for example 5 V peak-to-peak. In FIG. 8A, the spectral energy associated with $1f_c$ has an EMI amplitude A1. However, in FIG. 8B, the A1 quantum of EMI energy is distributed over $1f_c$ and $1f_c \pm k(f_{horiz}/2)$, where k is an integer (e.g., 1, 2, 3, . . . ) representing the sidebands (four of which are shown for each harmonic in FIG. 8B). Thus, the maximum amplitude of EMI energy associated with $1f_c$ is A1', which is less than prior art amplitude A1. Since the adjacent spectra are intentionally spread apart in frequency an amount $\Delta f > 0.5 f_m$, the maximum measured spectra energy associated with $1f_c$ will be $\leq A1'$.

Whereas the spectral energy associated with the third harmonic in prior art FIG. 8A is A3, the A3 quantum of energy is dispersed in FIG. 8B around $3f_c$, $3f_c \pm k(f_{horiz}/2)$. Thus, in FIG. 8B, the maximum EMI energy associated with $3f_c$ is A3', where A3'<A3. In like fashion, the spectral energy associated with each harmonic for a prior art square-wave clock frequency will be distributed in root-mean-square fashion about the corresponding harmonic in FIG. 8B. Again the result is that at any position of the EMI reference window along the frequency spectrum, less EMI energy is captured, and thus less EMI is present.

For ease of illustration FIG. 8B shows only seven harmonics, although it is understood that higher harmonics may also be present. Further, FIGS. 8A and 8B depict spectra for idealized clock signals. In reality, actual clock signals will have finite transition times and may have Fourier transforms that include even numbered harmonics. However, spectral energy associated with any even harmonics will also be distributed over frequency, according to the present invention. EMI will still be decreased, similarly to what has been described with respect to FIG. 8B.

The pixel clock signal was phase modulated by a square-wave having a frequency $f_{horiz}/2$. This, in FIG. 8B, sideband spectra are spread apart by multiples of $f_{horiz}/2$.

Implementation of the preferred embodiment has been described with respect to a clock swallowing circuit. However, a suitable amount of spectrum-spreading, EMI-reducing non-periodicity may be introduced into a panel clock signal using other techniques as well. For example, phase shifting may be introduced by passing the main oscillator signal through registers or delay lines. A delayed and an undelayed version of the main oscillator signal may then be combined, for example using a multiplex switch, to produce an appropriate clock dropper output signal.

Of course, rates of phase change in the clock signal other than what was described with respect to the preferred embodiment are acceptable. The critical requirement is that at least some adjacent spectra in FIG. 8B are separated by a frequency amount greater than half the EMI standard reference window $f_m$.

Applicants tested the present invention using a modified TGX-type video card, two pulse generators and a divide-by-two circuit. In a "normal" state, the first pulse generator produced a constant "high" level that was input to the second pulse generator. The second generator then output a 27 MHz clock signal that was halved to 13.5 MHz by the frequency divider circuit. The TGX card generated a horizontal synchronization signal every 71.7 KHz, whereupon the first generator output went low for 37 ns, which is effectively one 27 MHz clock pulse. Because the second generator's gate input was then low, its output was forced low for 37 ns, after which it resumed its normal clock output. This test configuration effectively dropped one 27 MHz clock, which shifted the phase of the 13.5 MHz signal at the divided-by-two by $\phi = 180°$.

Tables 1 and 2 below reflect a sampling of the EMI test data measured for the described test implementation. On average, EMI was reduced by approximately 6 dB to 8 dB. Table 1 data were measured using horizontal polarity to the limits of the Japanese VCCI II standard, and Table 2 data using vertical polarity, again to VCCI II limits.

TABLE 1

EMI MEASUREMENT DATA

| Frequency (MHz) | Clock Dropper OFF (dB) | Clock Dropper ON (dB) | Delta (dB) |
|---|---|---|---|
| 138.38 | −3.17 | −15.47 | −12.3 |
| 153.76 | −0.95 | −8.46 | −7.5 |
| 215.25 | −5.23 | −10.53 | −5.3 |
| 246.01 | −11.73 | −18.23 | −6.5 |
| 292.16 | −11.31 | −18.01 | −6.7 |

TABLE 2

EMI MEASUREMENT DATA

| Frequency (MHz) | Clock Dropper OFF (dB) | Clock Dropper ON (dB) | Delta (dB) |
|---|---|---|---|
| 261.78 | −16.69 | −22.69 | −6.0 |

It will be appreciated that implementing a clock dropper or clock swallower or other phase shift circuit may be accomplished using off-the-shelf components. In the preferred embodiment, standard logic integrated circuits are used that require relatively little integrated circuit chip area, and that consume relatively little operating power.

Further, implementing the present invention can permit a relaxation of specifications for any low pass filters 120, ferrites 130, and/or shielding 150 that may also be used. As such, the present invention can reduce EMI without impacting system cooling.

Figure 9A:
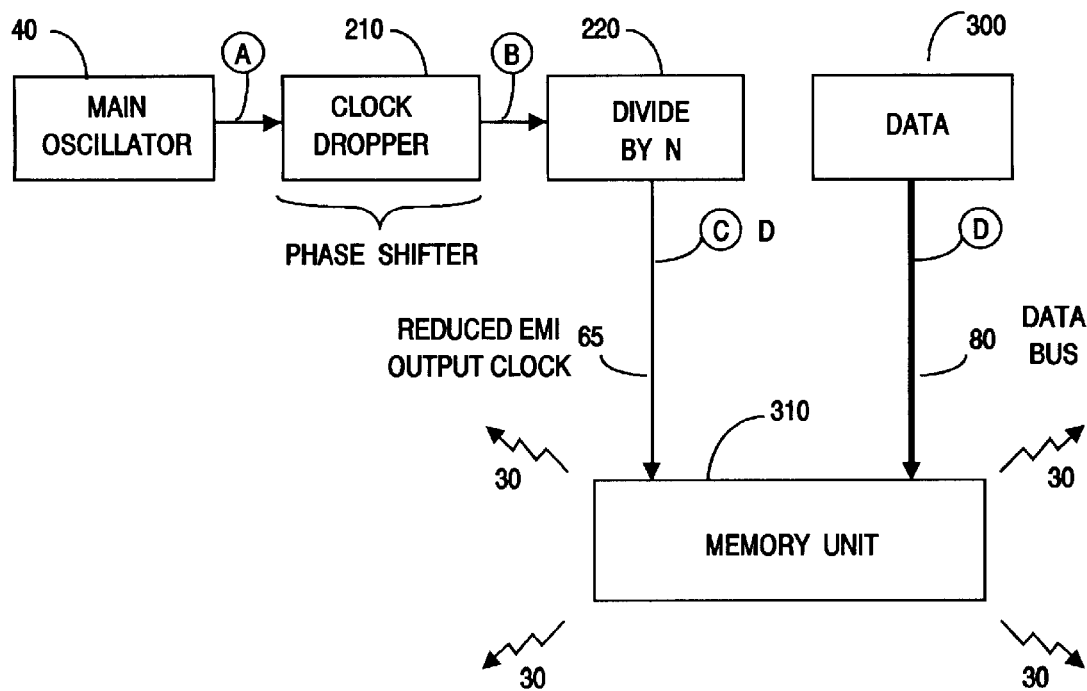
FIG. 9A depicts EMI reduction in a memory unit coupled to an output clock generated according to the present invention.

Those skilled in the art will further appreciate that EMI may be reduced according to the present invention in applications other than video display systems. For example, FIG. 9A depicts a source of data 300 coupled via a data bus 80 to a memory unit 310. The data is clocked into (or out of) memory unit 310 as a function of an output clock 65 that preferably is generated in the same manner as horizontal synchronization signal 60 in FIG. 3. As a result, while the memory unit may emit EMI 30, the magnitude of such EMI will be lower than if the output clock 65 were a square-wave.

Figure 9B:
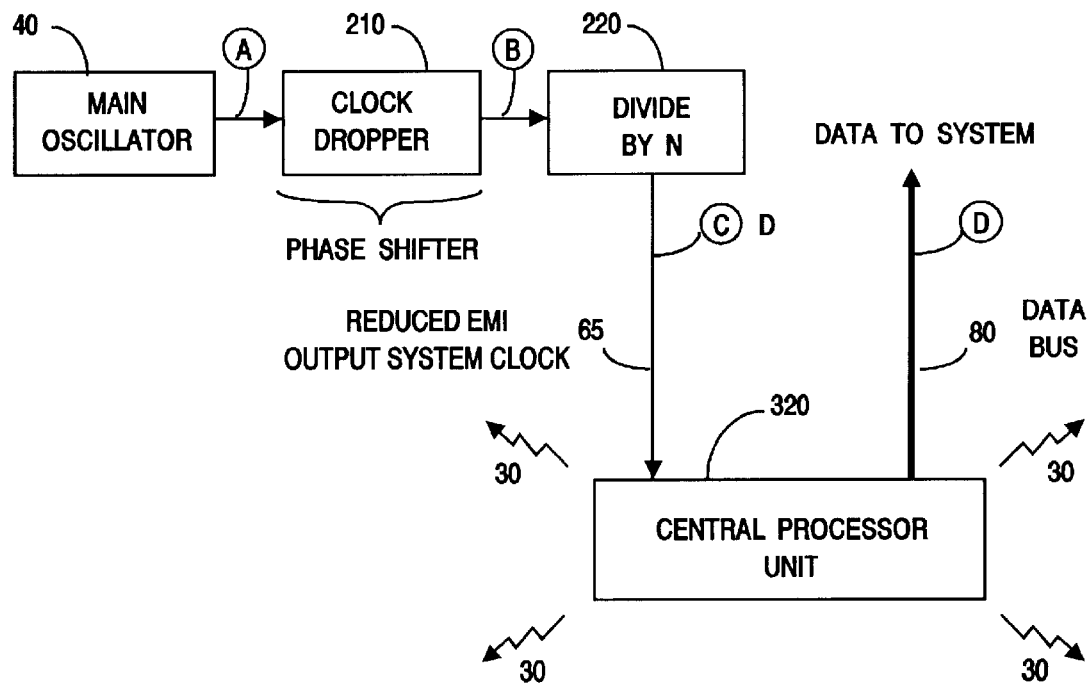
FIG. 9B depicts EMI reduction in a central processor unit coupled to a system output clock generated according to the present invention.

In FIG. 9B, a central processor unit 320 transfers (or receives) system data via a data bus 80. Such data is transferred as a function of an output system clock 65 that preferably is generated in the same manner as the horizontal synchronization signal 60 in FIG. 3. While the central processor unit 320 may still emit EMI 30, the magnitude of this EMI will be lower than if the system clock 65 were a square-wave.

Modifications and variations may be made to the disclosed embodiments without departing from the subject and spirit of the invention as defined by the following claims.

What is claimed is:

1. A method for reducing emission of electromagnetic interference generated in displaying video on a cathode ray tube coupled to at least a video data signal and a horizontal synchronization signal, said video data signal and said horizontal synchronization signal being derivable from a pixel clock signal, the method comprising the following steps:

time-shifting said video data signal so as to produce therein at least a first phase and a second phase at a phase rate of change ($f_{r\text{-}o\text{-}c}$) producing a sufficiently large frequency spread ($\Delta f$) in a Fourier transform of said pixel clock signal as to move at least some spectral components of said pixel clock signal outside an EMI measurement window having bandwidth $f_m$;

wherein measurable spectral components of said Fourier transform remaining within said bandwidth $f_m$ are reduced.

2. The method of claim 1, further including a step of identically time-shifting said horizontal synchronization signal as well as said video data signal.

3. The method of claim 1, wherein said time-shifting is carried out by forming said pixel clock signal from an intermediate clock signal of frequency $Nf_c$, wherein said pixel clock signal has frequency $f_c$ and N is an integer $\geq 2$; and frequency dividing by N and phase modulating said intermediate clock signal to generate a said pixel clock signal having clock pulses comprising said first phase and said second phase, wherein said clock pulses comprising said second phase are phase shifted by $\phi > 0°$ relative to said clock pulses comprising said first phase.

4. The method of claim 3, wherein frequency dividing by N and phase modulating is carried out by coupling said intermediate clock output as input to a clock dropper circuit whose output signal is divided-by-two and used to generate said horizontal synchronization signal and said pixel data clock signal.

5. The method of claim 3, wherein said first phase and said second phase have substantially equal time periods, and wherein $\phi$ is 180°.

6. The method of claim 1, wherein said cathode ray tube has a horizontal scan rate $f_{horiz}$, and wherein said $f_{r-o-c} = 0.5 \times f_{horiz} = \Delta f$.

7. The method of claim 6, wherein said $f_{horiz} \approx 82$ KHz, said $f_m \approx 120$ KHz, and wherein measurable spectral components within said bandwidth $f_m$ are reduced sufficiently to enable said cathode ray tube to meet FCC Class B EMI Specification.

8. The method of claim 1, wherein said $f_m$ and said $f_{r-o-c}$ have a frequency relationship defined by (a) said $f_{r-o-c}$ exceeds about 33% of said $f_m$, or (b) said $f_m \approx 120$ KHz and said $f_{r-o-c}$ exceeds about 40 KHz.

9. A method for reducing emission of electromagnetic interference generated in displaying video on a cathode ray tube coupled to at least a video data signal and a horizontal synchronization signal, said video data signal and said horizontal synchronization signal being derivable from a pixel clock signal, the method comprising the following steps:

time-shifting said video data signal and said horizontal synchronization signal so as to produce in said video data signal and in said horizontal synchronization at least a first phase and a second phase at a phase rate of change ($f_{r-o-c}$) producing a sufficiently large frequency spread ($\Delta f$) in a Fourier transform of said pixel clock signal as to move at least some spectral components of said pixel clock signal outside an EMI measurement window having bandwidth $f_m$;

wherein measurable spectral components of said Fourier transform remaining within said bandwidth $f_m$ are reduced.

10. The method of claim 9, wherein said time-shifting is carried out by forming said pixel clock signal from an intermediate clock signal of frequency $Nf_c$, wherein said pixel clock signal has frequency $f_c$ and N is an integer $\geq 2$; and frequency dividing by N and phase modulating said intermediate clock signal to generate a said pixel clock signal having clock pulses comprising said first phase and said second phase, wherein said clock pulses comprising said second phase are phase shifted by $\phi > 0°$ relative to said clock pulses comprising said first phase.

11. The method of claim 10, wherein frequency dividing by N and phase modulating is carried out by coupling said intermediate clock output as input to a clock dropper circuit whose output signal is divided-by-two and used to generate said horizontal synchronization signal and said pixel data clock signal.

12. A system for reduction of emission of electromagnetic interference generated in displaying video on a cathode ray tube coupled to at least a video data signal and a horizontal synchronization signal, said video data signal and said horizontal synchronization signal being derivable from a pixel clock signal having fundamental frequency $f_c$, the system comprising:

time-shift circuitry causing said video data signal to include at least a first phase and a second phase at a phase rate of change ($f_{r-o-c}$) producing a sufficiently large frequency spread ($\Delta f$) in a Fourier transform of said pixel clock signal as to move at least some spectral components of said pixel clock signal outside an EMI measurement window having bandwidth $f_m$.

13. The system of claim 12, wherein said time-shift circuitry further introduces at least said first phase and said second phase into said horizontal synchronization signal.

14. The system of claim 13, wherein said time-shift circuitry includes:

a main oscillator outputting a main pulse train having frequency $Nf_c$, where N is an integer $\geq 2$;

a clock dropper circuit having a first input coupled to receive said main pulse train, and a second input coupled to receive said horizontal synchronization signal, and outputting a clock dropper output signal of frequency $Nf_c$ but wherein at least one pulse in said main pulse train is dropped in a time period comparable to a time period of said horizontal synchronization signal;

a divide-by-N circuit, coupled to receive and to frequency-divide-by-N said clock dropper output signal and to output a said data clock signal of frequency $f_c$;

a timing generator circuit, coupled to receive the output signal from said divided-by-N circuit and to output said horizontal synchronization signal;

wherein said horizontal synchronization signal comprises said first phase and said second phase, wherein said clock pulses comprising said second phase are phase shifted by $\phi > 0°$ relative to said clock pulses comprising said first phase, wherein changes between said first phase and said second phase occur at a said frequency $f_{r-o-c} \approx 0.5 \times f_{horiz}$; and said video data signal is clocked by said data clock signal and also includes said first phase and said second phase.

15. The system of claim 14, wherein said first phase and said second phase have substantially equal time periods, and wherein $\phi$ is 180°.

16. The system of claim 14, wherein said time-shifting is carried out by forming said pixel clock signal from an intermediate clock signal of frequency $Nf_c$, wherein said pixel clock signal has frequency $f_c$ and N is an integer $\geq 2$; and frequency dividing by N and phase modulating said intermediate clock signal to generate a said pixel clock signal having clock pulses comprising said first phase and said second phase.

17. The system of claim 16, wherein said time-shifting circuitry includes a clock dropper circuit having a first input coupled to receive said intermediate clock, and whose output signal is frequency divided-by-N and used to generate said horizontal synchronization signal and said pixel data clock signal.

18. The system of claim 17, wherein frequency division is carried out using a divide-by-two flipflop whose output signal is used to generate said horizontal synchronization signal and said pixel data clock signal.

19. The system of claim 14, wherein said cathode ray tube has a horizontal scan rate $f_{horiz}$, and wherein said $f_{r-o-c}=0.5 \times f_{horiz}=\Delta f$.

20. The system of claim 14, wherein said $f_{horiz} \approx 82$ KHz, said $f_m \approx 120$ KHz, and wherein measurable spectral components within said bandwidth $f_m$ are reduced sufficiently to enable said cathode ray tube to meet FCC Class B EMI Specification.

21. The method of claim 14, wherein said $f_m$ and said $f_{r-o-c}$ have a frequency relationship defined by (a) said $f_{r-o-c}$ exceeds about 33% of said $f_m$, or (b) said $f_m \approx 120$ KHz and said $f_{r-o-c}$ exceeds about 40 KHz.

22. The system of claim 14, wherein said cathode ray tube is a video display monitor in a computing system.

* * * * *